United States Patent [19]

Hunt

[11] 3,731,098
[45] May 1, 1973

[54] IMAGE SCANNER DRIVE SYSTEM
[75] Inventor: Robert P. Hunt, Menlo Park, Calif.
[73] Assignee: Spectrotherm Corp., Mountain View, Calif.
[22] Filed: Mar. 6, 1972
[21] Appl. No.: 232,036

[52] U.S. Cl...........250/83.3 H, 178/7.6, 178/DIG. 8, 250/83.3 HP, 250/206, 250/234, 318/640
[51] Int. Cl.................................................H04n 3/16
[58] Field of Search..................318/640; 250/83.3 H, 250/83.3 HP; 178/7.6, DIG. 8; 250/206, 234

[56] References Cited

UNITED STATES PATENTS

| | | | |
|---|---|---|---|
| 3,624,291 | 11/1971 | Miyata | 178/7.6 |
| 3,597,617 | 8/1971 | Passaro | 250/83.3 H X |
| 3,021,428 | 2/1962 | Mattke et al. | 250/83.3 H |

Primary Examiner—J. D. Miller
Assistant Examiner—H. Huberfeld
Attorney—Karl A. Limbach et al.

[57] ABSTRACT

A position detection technique for use in motion control feedback systems. The position of an object is determined by optically modulating a light beam an amount proportional to the position of the object. The degree of optical modulation is then detected by a detector not mechanically connected with the object. A position signal developed by the detector is used in an electronic feedback circuit to accurately control the position of the object. An improved operational amplifier circuit for supplying an object driving motor is disclosed along with an improved delay circuit for controlling object motion.

17 Claims, 6 Drawing Figures

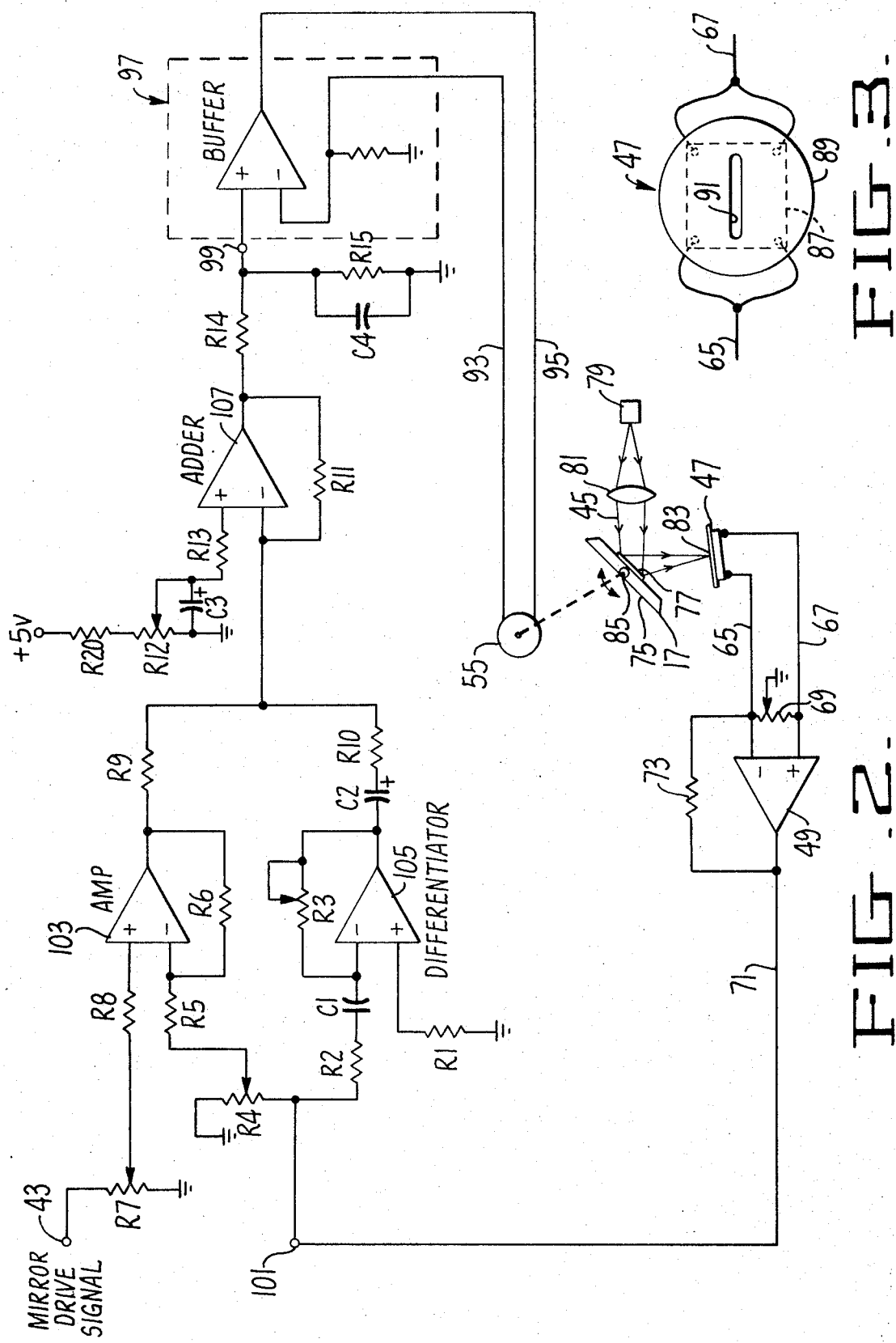

Patented May 1, 1973 3,731,098

IMAGE SCANNER DRIVE SYSTEM

BACKGROUND OF THE INVENTION

The present invention relates generally to position control techniques, and more specifically to position feedback systems using optical position sensing methods.

Systems for accurately controlling mechanical motion are well known, wherein some mechanical parameter, such as position, velocity, or acceleration is sensed. An electrical signal proportional to the magnitude of the parameter of interest is compared with an input reference signal proportional to the desired magnitude of the parameter. An error signal representing the difference between the desired signal and the detected signal is then used to drive the mechanical element until the error disappears. The error will disappear when the mechanical parameter of the element has been adjusted so that its feedback electrical signal is equal to the input reference signal, the desired condition.

An environment for use of such general techniques is in various types of optical scanners wherein an optical element, such as a mirror, is desired to be moved, such as by rotation about some axis passing through the optical element, in order to scan an image across a detector. As the image is scanned across the detector, a time varying electronic signal is developed at the output of the detector from which the image can be reconstructed in a cathode ray tube or some other display device at an adjacent or distant point. One specific optical scanning application exists in a thermograph wherein infrared energy radiating from an object is to be detected. Such a device is very useful in medical diagnostic work where the object is a human patient. In order to satisfactorily detect a two-dimensional image with a two-dimensional array of individual detectors, a device would be far too expensive for a commercial product. Thus, a point infrared detector is utilized and a two-dimensional image is scanned thereover.

Many other types of electromagnetic energy detectors use a point detector with a scanning mechanism. In this class of devices, it is desirable to scan the image over the detector in a very accurate manner so that the electronic signal generated thereby can be reconstructed in a cathode ray tube or other display device without distortion. A mirror is often used as an optical element for scanning an image in one of the two directions across a point detector. The angular position of the mirror is thus desirably carefully controlled. Also, it is desirable that the mirror be capable of rapidly changing its angular position upon receipt of an appropriate position control signal in a short amount of time and without the mirror overshooting its desired position. Accordingly, it is an object of the present invention to provide a technique for precision control of the position of an optical scanning element without mechanical contact between the sensing and scanning elements and without otherwise interfering with its image scanning function.

It is more generally an object of the present invention to provide an improved motion control method and apparatus with wide application to various motion detection and control environments.

SUMMARY OF THE INVENTION

Briefly, the techniques of the present invention for detecting and controlling mechanical motion include translation of the mechanical motion into some type of light variation. These light variations are then detected and translated into electrical signals which are proportional to the mechanical motion being measured. The electrical signals are compared with a reference signal that is proportional to the desired mechanical motion. An error signal between the detected mechanical motion and the desired mechanical motion is then used to change the mechanical motion in an electrical/mechanical feedback loop. The type of mechanical motion that may be detected includes position of an element, its velocity or its acceleration.

Light modulation is accomplished according to one aspect of the present invention by attaching an optical element to the mechanical element whose motion is being observed, wherein the optical element modulates light in a manner that may be detected to determine the nature of mechanical motion of the element. In one aspect of this technique, angular position of an object is monitored by fastening a mirror to rotate with the object. A light beam is directed at the mirror in a manner that is brought to a substantially point focus on a linear photo detector. The angular position of the mirror, and thus the angular position of the object, determines where the light beam substantial focus will strike the linear detector. Thus, the photo detector has an electrical signal output that is proportional to the position of the mechanical element. An advantage of this technique of monitoring angular motion is that the mirror attached to the mechanical element may be of very light weight and generally not interfere with the mechanical motion while other means for detecting angular position may affect mechanical motion of the element to a more significant extent.

An example of the techniques of the present invention described hereinafter with respect to the drawings provides a method for controlling very accurately the motion of an image scanning mirror that is rotated about an axis to scan an image over a detector. The mirror reflects an object field onto a detector and scans it thereacross. The backside of the mirror is utilized to reflect a position detecting light beam onto a linear detector. Only an area on the backside of the mirror large enough to reflect the light beam in all of its angular positions of interest is actually made reflective. This limited mirror size reduces spurious reflections onto the photo detector which can result in erroneous readings. If a two-dimensional linear photo detector is used, it is converted to a one-dimensional detector by the use of a mask having a long slit therein for blocking off any spurious reflections other than the desired light beam scanning thereacross in a single direction. The signal of the linear detector output is amplified, a differential thereof is taken electronically and the differential is added back into the amplified detector signal as a means of electronically damping the scanning mirror's angular motion. It is preferable that the mirror be critically damped and electronic techniques for this are preferred because of reduced mechanical and electrical power wasted.

Other optical elements than the mirror may, of course, be utilized, such as a refracting element. Other types of modulation of a light beam may also be used other than a simple position modulation. For instance, the light beam could be intensity modulated by an optical element in response to mechanical motion, a plurality of light spots could be moved in response to object motion past a detector which counts the light spots as a means of determining mechanical object motion. In addition, a moving optical element can control the degree of overlay of light interference patterns and the average intensity of the overlay detected.

More details of the various aspects of the present invention may be had by reference to the following description taken in conjunction with the drawings wherein an example of an angular position detecting technique of the present invention is given in some detail.

BRIEF DESCRIPTION OF THE DRAWINGS

FIG. 2 is a circuit diagram of a portion of the system of FIG. 1;

FIG. 3 shows an optical detector utilized in the circuit diagram of FIG. 2;

DESCRIPTION OF THE PREFERRED EMBODIMENTS

Figures 1, 1A:
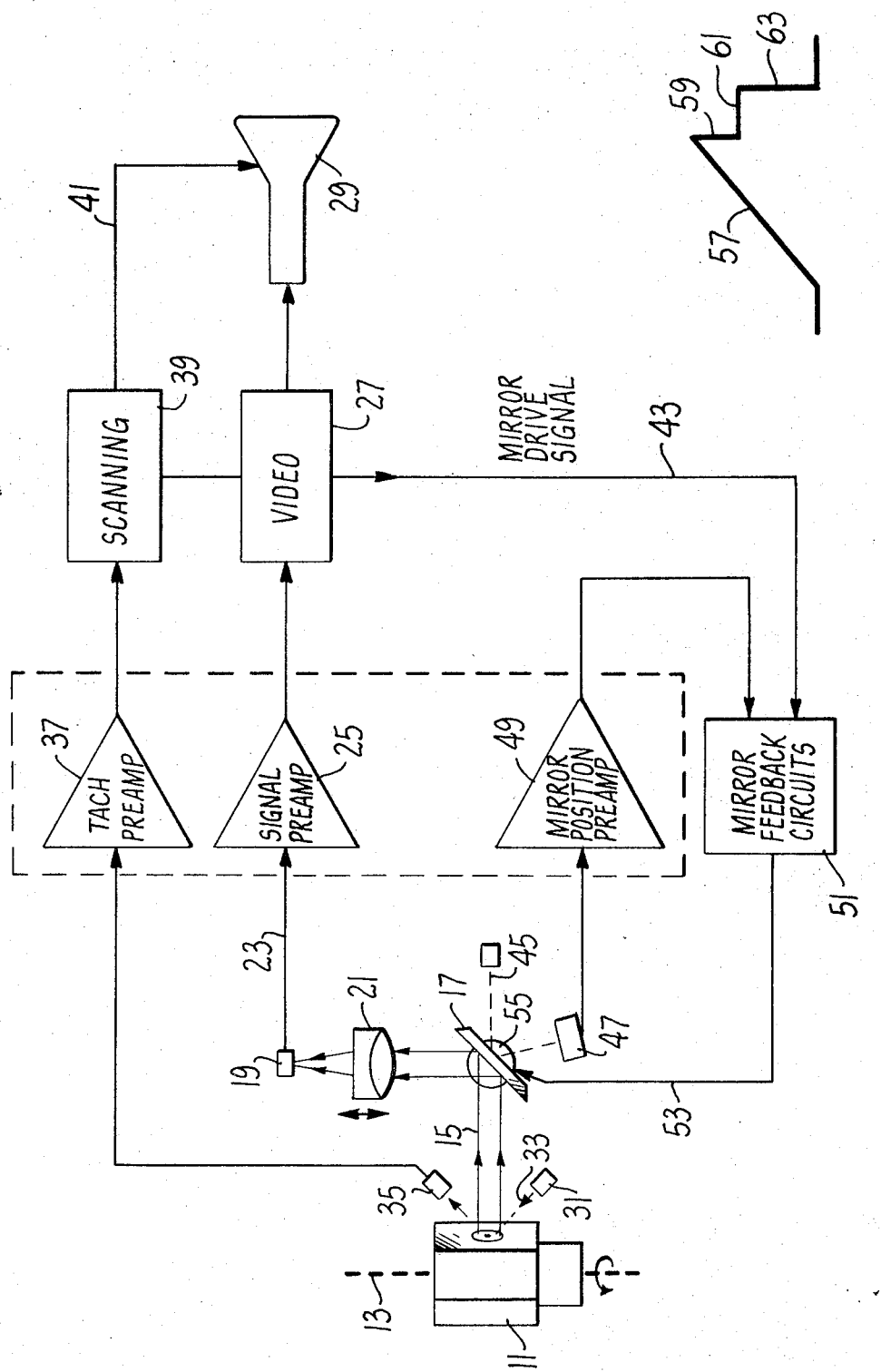
FIG. 1 illustrates in block diagram form one system in which the techniques of the present invention may be utilized.
FIG. 1A shows an example of a driving function for a mechanical element.

Referring to FIG. 1, a polygon mirror 11, shown to have six sides, is rotated about an axis 13 with which each of the mirrors is made to be accurately parallel. The motor which drives the polygon mirror 11 at a uniform angular velocity is preferably housed within the mirror assembly itself that is preferably made of a metal which shields the rest of the instrument from unwanted radiation. Light from an object field being imaged (traveling into the paper of FIG. 1) is reflected off of each of the mirrors one at a time as they are rotated. An object modified light beam 15 is reflected thereby onto an angularly rotatable mirror 17. The object modified light beam 15 is reflected by the mirror 17 onto an appropriate photo-detector 19. A lens assembly 21 is disposed in the object modified light beam and is made adjustable to focus an image of the desired object field onto the photo detector 19.

The photo-detector 19 is a substantial point and the two-dimensional object image is then scanned by the mirror assembly 11 and the mirror 17 over the point detector 19 is two dimensions. The polygon mirror assembly 11 scans a horizontal aspect of the object field across the detector 19 while the angular rocking mirror 17 scans the vertical aspect of the object image across the detector 19. In this way, a time varying electrical signal is generated at the output of the photo-detector 19 and in the line 23 which contains information of the object image. The signal in the line 23 is initially amplified by a preamplifier 25 and then is fed into a video processing circuit 27. The output of the video processing circuit 27 drives a cathode ray tube 29 which then converts the time varying electrical signals back into a two-dimensional image of the object being scanned.

In order for the image presented on the cathode ray tube 29 not to be distorted, the electron beam thereof must be scanned in the same pattern as the image is scanned across the detector 19. This synchronism is accomplished in the horizontal direction by a light source 31, such as a light emitting diode, which directs a beam of light 33 against the rotating polygon mirror assembly 11. The reflected light therefrom is detected by a photo-detector 35. A signal generated by the photo-detector 35 is amplified by a preamplifier 37. The output of the preamplifier 37 is thus a series of pulses, one pulse each time the rotating polygon mirror 11 has a mirror surface in a predetermined reference position wherein the reflected portion of the light beam 33 falls on the narrow photo-detector 35. This output of the preamplifier 37 controls a scanning circuit 39 which includes synchronous logic and horizontal and vertical scanning oscillators. The outputs of these oscillators are fed through a line 41 to the deflection coils of the cathode ray tube 29 for controlling the path of the electron beam.

The image is scanned in a vertical direction across the detector 19 in accordance with a mirror drive signal in a line 43 which is in synchronism with the vertical oscillator output of the scanning circuit 39 that is delivered through the line 41 to the cathode ray tube 29. In order to avoid distortion of the image displayed on the cathode ray tube 29, it is important, therefore, that the mirror 17 be scanned in a very accurate manner in accordance with the output of the vertical oscillator. This is accomplished by the use of a feedback network wherein the angular position of the mirror 17 is detected by reflecting a light beam 45 from its backside and onto a linear photo-detector 47. The output of the photo detector 47 is amplified by a preamplifier 49 and the output of the preamplifier 49 is fed through a feedback circuit 51 and a line 53 to a torque motor 55 which controls the angular position of the mirror 17. The position signal at the output of the preamplifier 49 is compared in the feedback circuit 51 with the desired motion signal in the line 43 that is developed from the vertical scanning oscillator. The practical range of rotation of the mirror 17 with this particular method of detection is about 90° or less. A maximum angle of 15° rotation is a typical one for a thermograph as illustrated.

The type of system shown in FIG. 1 has a primary use where electromagnetic light energy being detected by the detector 19 is in the invisible and near visible regions. The system thus serves to translate electromagnetic energy from without the visible spectrum into a visible display on the face of the cathode ray tube 29. An example of such electromagnetic energy is infrared radiation. One use of such a system is for medical diagnostic work wherein an image of a human patient displays the patient's temperature. The detector 19 for an infrared thermograph is preferably a mercury-cadmium-telluride detector which changes resistance in response to infrared radiation intensity.

An example of a mirror drive voltage signal in the line 45 is shown in FIG. 1A. This signal example includes a rising slope 57, a sharp decline 59, a level portion 61 and another sharp decline 63 to complete a voltage cycle of the mirror drive signal 43. A feedback circuit is desired to assure that the mirror 17 follows as accurately as possible this rather complicated voltage waveform in scanning out a single picture frame.

Referring to FIG. 2, a preferred feedback circuit 51 of FIG. 1 for controlling the motion of the mirror 17 is shown in some detail. The electrical output of the detector 47 is provided in lines 65 and 67 connected with the inverting and non-inverting inputs, respectively, of an operational amplifier, which is the preamplifier 49. A variable resistance 69 is connected across the inputs of the amplifier 49 with its adjustable terminal connected to ground in order to make possible the balancing of the preamplifier input lines to ground. An output line 71 of the amplifier 49 is connected through a feedback resistance 73 to its inverting input. The voltage in the output line 71 is desired to be linearly related to the angular position of the mirror 17.

One side 75 of the mirror 17 is the side used for scanning the object field across the detector 19 as described with respect to FIG. 1. On the opposite side of the mirror 17 is smaller reflective area 77 for reflecting a detecting light beam 79 onto the photo-detector 47. The light beam 45 is generated by a convenient light source 79, such as a light emitting diode, and is controlled by a lens 81 so that it comes to a substantial point focus 83 on the photosensitive surface of the detector 47. As the mirror 17 is rotated in both directions about its axis 85 by the torque motor 55, the substantial point light beam 83 will travel back and forth across the photo-detector 47. Since the voltage output in the lines 65 and 67 of the detector 47 is proportional linearly to the position of the light point 83 thereacross, its output signal is thus linearly proportional to the angular position of the mirror 17. The output 71 of the preamplifier 49 is thus also linearly related to the angular position of the mirror 17. The mirror 77 is made as small as possible yet remains large enough to intercept and reflect at all times the sensing light beam 45 onto the detector 47 in all anticipated angular positions of the mirror 17. The small size of the mirror 77 is desired in order to minimize the possibility that spurious light radiation may be reflected onto the photo-detector 47 and thus to cause an error in its output signal.

Referring to FIG. 3, the preferred detector 47 is shown in plan view wherein a two-dimensional photosensitive semiconductor material 87 is covered with an opaque mask 89 to leave a substantially one-dimensional line slit 91 through which the substantially point focused light 83 is scanned back and forth therealong upon rocking of the mirror 17. Each of the four corners of the detector material 87 is provided with an external electrical wire. The two contact points at one end of the slit 91 are connected together and to the output line 65 while the remaining two contact points at the opposite end of the slit 91 are connected together to the output line 67. The mask 89 with its narrow slit 91 limits the exposed photo-detector area to that required to perform the desired function in order to minimize the possibility that undesired light may affect its output signal.

The mirror driving torque motor 55 is of a type that can drive the mirror 17 in both angular directions upon receipt of different polarity direct current in its supply lines 93 and 95. The required current with the proper polarity is supplied by a buffer amplifier 97 in response to a signal at a point 99. The signal at the point 99 at any instant is an error signal between the actual position of the mirror 17 and its desired position as embodied in the mirror drive input signal in the line 43. The buffer amplifier 97 drives the torque motor 55 in a direction which moves the mirror 17 to eliminate the error voltage at the point 99. A preferred buffer amplifier circuit is described hereinafter with respect to FIG. 4.

That portion of the circuit of FIG. 2 between a point 101 in the feedback signal line 77 and the point 99 compares the signal in the line 71 with the desired mirror position signal at the point 43. This portion of the circuit also provides damping of the mirror assembly 17 by electronic means. The feedback signal at the point 101 is passed directly to the point 99 by an operational amplifier 103 upon connection with its inverting input through appropriate input resistors R4 and R5. The non-inverting input of the amplifier 103 is connected with the mirror drive signal input 43 through appropriate input resistors R7 and R8. The feedback signal at the point 101 is differentiated by an operational amplifier 105 by connection thereof to its inverting input through a series arrangement of a capacitor C1 and a resistor R2. The output of the amplifier 105 is a signal that is the differential of the feedback signal at the point 101. The input resistor R2 is used in series with the differentiating capacitor C1 in order to serve as an upper limit on the output voltage to which the amplifier 105 is driven. A feedback resistor $R_3$ between the output of the amplifier 105 and its inverting input is made adjustable in order to vary the damping that is being electronically introduced in the driving motion of the mirror 17. The circuits are preferably adjusted for critical damping of the mirror 17.

The outputs of the amplifiers 103 and 105 are combined at an inverting input of an operational amplifier 107. An adjustable direct current voltage is applied to the non-inverting input of the amplifier 107 in order to provide an offset signal to the torque motor 55. The output of the summing operational amplifier 107, through a series resistance R14, becomes the signal at the point 99 which is used to drive the torque motor 55.

Figure 4:
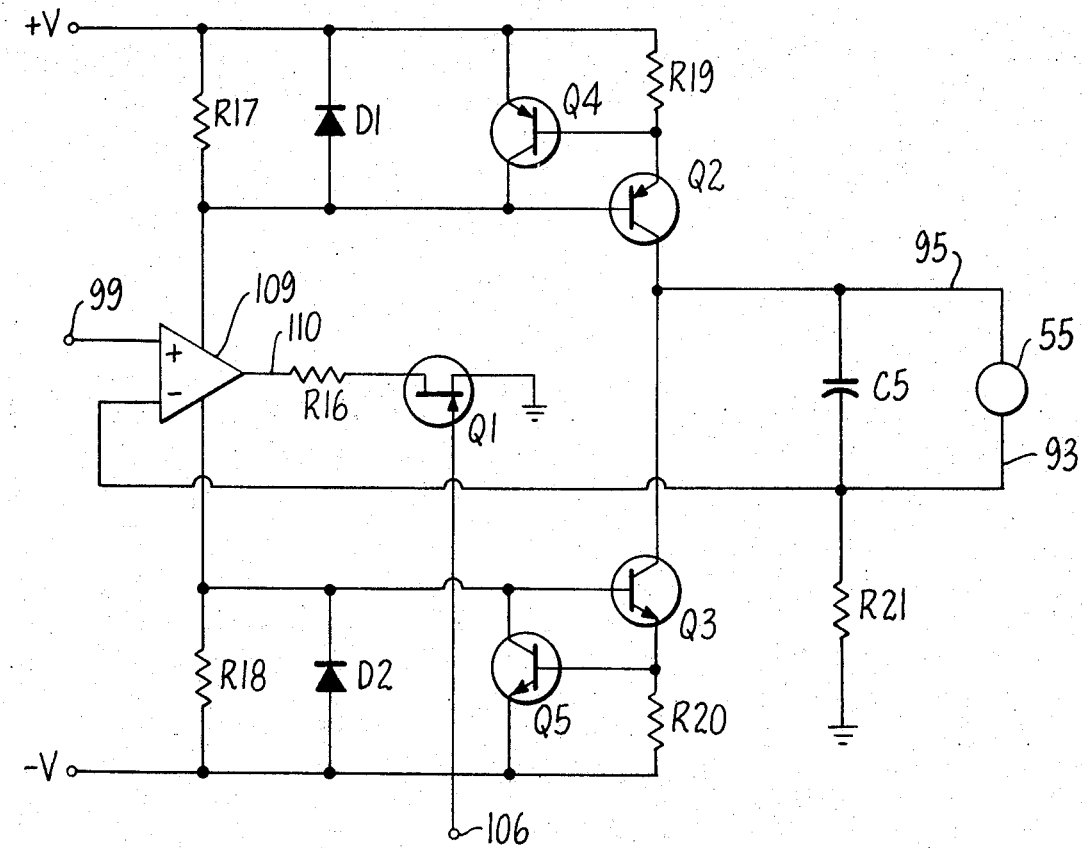
FIG. 4 shows additional detailed circuit diagrams of the feedback circuit of FIG. 2.

Specific values of components shown in FIG. 2 may be, as an example, the following:

Amplifiers 49, 103, 105 and 107 – 741 type, each
R1 — 47 k
R2 — 15k
R3 — 50k
R4 — 1k
R5 — 470 ohms
R6 — 2.2k
R7 — 1k
R8 — 470 ohms
R9 — 3.3k
R10 — 3.3k
R11 — 22k
R12, R13, R14, R15, R30 — 1k each
C1 — 0.1uf
C2 — 47uf
C3 — 15uf
C4 — 0.1uf
Torque Motor 55 — T4–150 available from Mechanics for Electronics Position Detector 47 — A linear photo-detector, part No. SC/10 of United Detector Technology The preferred buffer amplifier 97 which drives the torque motor 55 is shown in FIG. 4. The error signal at the point 99 is connected with the non-inverting input of an operational amplifier 109. A feedback signal is connected to the inverting input of the amplifier 109 in the form of the line 93 from the torque motor 55. A current for driving the torque motor 55 is provided through a line 95 from the amplifier 109. A feedback resistor R21 is connected between the line 93 at one side of the torque motor 55 and ground potential. It is the current through the resistor R21 that develops a voltage drop thereacross that is equal at all times to the voltage difference between the inverting and the non-inverting inputs of the amplifier 109. About 0.30 amperes of current is supplied to the torque motor 55 per volt applied to the non-inverting input of the operational amplifier 109, for the particular R21 value described herein.

Current is supplied to the torque motor 55 from a push-pull circuit that includes transistors Q2 and Q3 operating as class B amplifiers. The collectors of the transistors Q2 and Q3 are connected through the line 95 to one side of the torque motor 55 and supplies current thereto. The emitter of the transistor Q2 is connected to the +V voltage supply through a resistor R19. The emitter of the transistor Q3 is connected to the −V voltage supply through a resistor R20. For the specific circuit components described hereinafter, as an example, the +V voltage is equal to +10 volts and the −V voltage is equal to −10 volts.

The operational amplifier 109 is also supplied from the +V and −V voltage terminals through resistors R17 and R18, respectively. Instead of driving the torque motor 55 (or the transistors Q2 and Q3) from an output 110 of the operational amplifier 109, the output 110 is normally connected to ground potential through a series combination of resistor R16 and FET device Q1. Since the operational amplifier 109 will draw current through its voltage supply resistors R17 and R18 only when current is demanded of it at its output 110, the voltage drop across the resistors R17 and R18 may be utilized as the output signal of the amplifier 109 rather than using the output 110 directly. Therefore, it is the voltage drops across the resistors R17 and R18 in the voltage supply lines to the amplifier 109 that are used to drive the amplifying transistors Q2 and Q3 by connecting their bases to the amplifier side of the resistors R17 and R18, respectively. With Q1 in an "on" state providing a low resistance path of the output 110 to ground, the varying voltage at the input point 99 will be followed by a varying voltage across either the resistor R17 or the resistor R18, depending upon whether the voltage at 99 is positive or negative. When the input voltage at the point 99 is positive, a current flows through Q2, the torque motor 55 and the resistor R21 to ground. When the voltage at the point 99 is negative, the current flows from ground through the resistor R21, the torque motor 55, and through the transistor Q3.

Diodes D1 and D2 are connected across the voltage supply resistors R17 and R18, respectively, for protection of the various semiconductor devices against inductive voltage transients. Transistors Q4 and Q5 connected with their collectors and emitters across the resistors R17 and R18, respectively, serve to limit the current supplied to the torque motor 55. The bases of the transistors Q4 and Q5 are connected with the emitters of transistors Q2 and Q3, respectively. Too much current to the torque motor 55 may demagnetize it.

Instead of connecting the output 110 of the amplifier 109 directly to ground through the resistor R16, the transistor Q1 is provided as a means for turning off load current to the torque motor 55. When Q1 is turned off (high resistance state), no current will flow through the output 110 of the amplifier 109 and thus little or no current will flow through the resistors R17 and R18 to the amplifier 109 from the supply voltage terminals Q1 may be turned off by applying a sufficient negative voltage to its gate at the circuit terminal 106. When Q1 is turned off, the mirror 17 of FIG. 2 will not operate in response to the input driving signal at the terminal 43. Thus, the entire circuit may be turned on or off by controlling the voltage at the gate of the FET device Q1. This may be by manual means or by automatic circuits.

In the application of the various aspects of the present invention to a system of scanning an image over a detector as shown in FIG. 1, it will be recognized that it takes a short time for the polygon mirror 11 to reach its driving speed once the power is first turned on to the system. While the rotating polygon mirror 11 is coming up to speed, the mirror 17 will have a tendency to act erratically and hit hard against its mechanical stops, particularly due to power supply turn on transients. Therefore, it is desirable to disconnect the driving circuit to the vertical scanning mirror 17 during the first few seconds that power is applied to the system of FIG. 1. A circuit for accomplishing this delay is shown in detail in FIG. 5 and is used in conjunction with the controlling FET device Q1 of FIG. 4 to keep power off to the torque motor 55 driving the mirror 17 for the first few seconds that power is turned onto the system. Of course, the voltage of the gate of Q1 may be manually controlled by applying an appropriate voltage to the terminal 106 to turn the current to the torque motor 55 on and off, but the circuit of FIG. 5 is preferred since it accomplishes the desired switching automatically without necessity for separate action by an operator using a scanning system of the type shown in FIG. 1.

Figure 5:
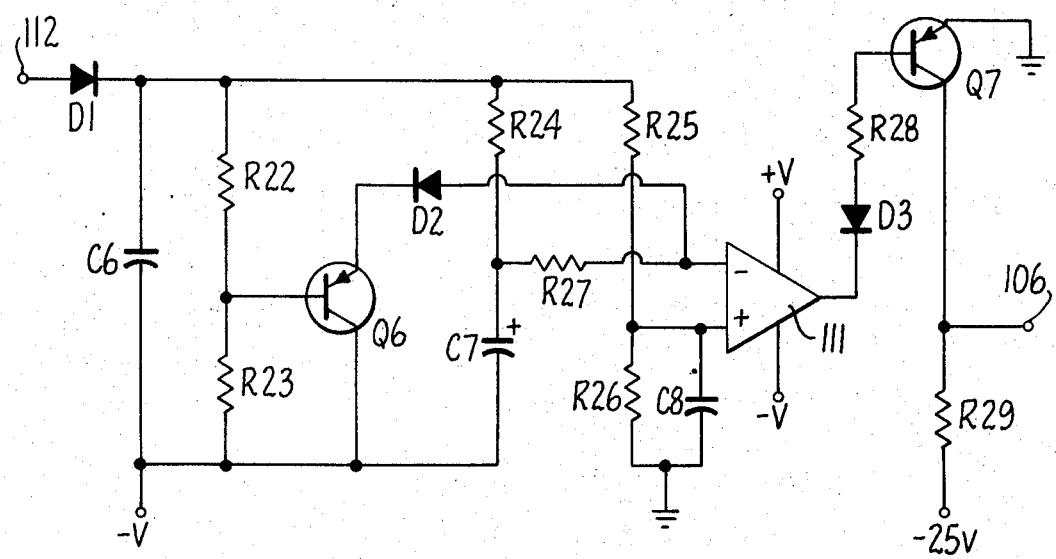
FIG. 5 is a circuit diagram of an electronic switch for use with the circuit of FIG. 4.

Referring to FIG. 5, a terminal 112 is connected to the power supply of a scanning system and thus immediately rises to a maximum AC voltage when power to the system is first turned on. The voltage at the terminal 112 will subsequently drop to zero immediately upon the power to the system being turned off. For the specific circuit components shown in FIG. 5, this voltage is about 21 volts A.C. which is connected to a diode D1 to rectify it into a direct current. A capacitor C6 and series resistors R22 and R23 are connected between this direct voltage point (which rises and falls as power is turned on and off to the system) and to a direct current power supply source −V, which in the case of the circuit of FIG. 5 is a −10 volts. A series circuit of a resistor R24 and a capacitor C7 is also connected between these direct current potentials. When power is first turned on to the system, a voltage is immediately impressed across the series combination of R24 and C7 which causes the voltage across the capacitor C7 to build up at a rate dependent upon the time constant fixed by the values of R24 and C7. The voltage across the capacitor C7 is communicated with an inverting input of an operational amplifier 111 through a resistor R27. When the voltage across the capacitor C7 exceeds that bias voltage applied to the non-inverting input of the amplifier 111 by a bridge of resistors R25, the output of the amplifier 111 is rapidly switched negative from its positive output state.

The output of the amplifier 111 is connected through a series combination of a diode D3 and a resistor R28 to the base of transistor Q7. The collector of the transistor Q7 is connected through a series resistance R29 to a negative direct current voltage supply, in this particular case a magnitude of −25 volts. The collector of the transistor Q7 also supplies the desired output signal to the terminal 106 which drives the FET device Q1 of FIG. 4.

When the voltage level at the point 112 of FIG. 5 first rises in response to the power being applied to a system in which the circuit is being used, the output of the amplifier 111 will be positive since the voltage applied to its non-inverting input will be greater than the voltage applied to its inverting input. The capacitor C7 is being charged through the resistor R24 and at some point when the voltage across the capacitor C7 exceeds that applied to the non-inverting input of the amplifier 111, the output of the amplifier 111 will switch to a negative value. When the power is first established to the system, the transistor Q7 is in its off state, the diode D3 is backed biased and the output at the terminal 106 is a −25 volts. This −25 volts as applied to the gate of the FET device Q1 of FIG. 4 will maintain it in an off state.

After the capacitor C7 has charged, however, and the output of the amplifier 111 has switched negative, the transistor Q7 is turned on and the output at the terminal 106 is substantially zero. The FET device Q1 of FIG. 4 is then turned on, which in turn turns on load current to the torque drive motor 55.

When system power is shut off, it is desirable that voltage at the output point 106 of the circuit of FIG. 5 rapidly change to the negative voltage level which turns off the transistor Q1 of FIG. 4. This is accomplished by rapidly discharging the capacitor C7 when an interruption in supply power is sensed at the point 112. This is accomplished by providing a discharge path across the capacitor C7 including the resistor R27, a diode D2 and a transistor Q6. The discharging resistance R27 is made considerably smaller in value than the charging resistance R24 so that the time constant on discharge is many times smaller than the time constant on charging the capacitor C7. When power at the point 112 of FIG. 5 is interrupted, the base of the transistor Q6 is effectively connected to its collector which then turns the transistor Q6 on heavily and forms a low resistance discharge path across the capacitor C7. This causes the output of the amplifier 111 to rapidly switch which turns transistor Q7 off and thus causes the output point 106 to go negative.

Specific values of components shown in FIG. 4 may be, as an example, the following:
Amplifier 109 — 741 type
R16 — 470 ohms
R17, R18 — 220 ohms
R19, R20, R21 — 3.3 ohms
C5 — 0.47 uf
Q1 — 2N5653
Q2 — 2N5195
Q3 — 2N5192
Q4 — 2N4403
Q5 — 2N4401
D1, D2 — 1N914 each Specific values of components shown in FIG. 5 may be, as an example, the following:
Amplifier 111 — 741 type
R22 — 3.3k
R23 — 3.9k
R24 — 220k
R25 — 4.7M
R26 — 1M
R27 — 100 ohms
R28 — 10k
C6 — 6.8uf
C7 — 47uf
C8 — 0.1uf
Q6, Q7 — 2N4403 each
D1 — 20A2
D2, D3 — 1N914

The various aspects of the present invention have been described with respect to specific preferred embodiments thereof, but it will be understood that the invention is defined by the appended claims.

I claim:

1. A method of controlling mechanical motion of an object, comprising the steps of:
   translating the mechanical motion into light variations,
   detecting the light variations and converting them into electrical signals that are proportional to the mechanical motion,
   comparing the motion electrical signals with a reference signal that is proportional to the desired mechanical motion, thereby to develop an error signal, and
   adjusting the mechanical motion in response to the error signal in a manner which tends to minimize the error signal.

2. A method of controllably driving a mechanical element, comprising the steps of:
   developing an electrical signal proportional to the desired position of the mechanical element as a function of time,
   modulating a light beam according to the actual position of the mechanical element,
   detecting the degree of light beam modulation,
   developing an electrical signal that is proportional to the degree of light beam modulation, whereby said electrical signal at each instant is proportional to the actual position of the mechanical element,
   continuously comparing the level of the desired position electrical signal with the level of the actual position electrical signal to develop an error signal, and changing the position of the mechanical element in response to said error signal.

3. A method as defined by claim 2 wherein the step of modulating a light beam includes reflecting said light beam from said mechanical element, thereby to direct the reflected light beam along a path that is dependent upon the position of the element, and further wherein the step of detecting the degree of light beam modulation includes detection of the path of the reflected light beam.

4. The method as defined by claim 2 which additionally comprises the step of electronically differentiating the position electrical signal and adding said differential to said error signal for changing the position of the mechanical element, whereby the differential signal provides an electronic damping.

5. Apparatus for controlling motion of an object, comprising,
a light modulator attached to said object,
means for directing a light beam toward said light modulator and thence as a modulated light beam,
a light detector positioned in the path of said modulated light beam for generation of an electrical signal that is proportional to the degree of light beam modulation, whereby said electrical signal is proportional to the position of the object,
means for comparing the object position electrical signal with a reference electrical signal, thereby producing an error signal, and
means including an electrical motor for driving the object in response to said error signal.

6. Apparatus according to claim 5 which additionally comprises an electronic differentiating circuit which adds a differential of said object position signal to said error signal for driving said electrical motor.

7. Apparatus according to claim 5 wherein said light modulator is a mirror and said light detector generates an electrical signal output proportional to the position at which the reflected light beam strikes the detector.

8. Apparatus according to claim 5 wherein said object is pinned in a manner to rotate back and forth about a single axis over an arc length less than 90°.

9. An optical scanning assembly, comprising,
a mirror that is rotatable about an axis for a defined arc distance less than 90°,
an electrical motor operably connected to said mirror for angularly rotating the mirror back and forth throughout its said defined arc distance,
means for directing electromagnetic energy from an object onto said mirror for controllable reflection therefrom,
a reflective surface on the backside of said mirror element,
means for directing a light beam onto said backside reflective surface from a position fixed in space with respect to the axis of rotation of said mirror element, thereby to generate a reflected light beam having a position that is proportional to the angular position of the mirror element, and
detecting means in the path of said reflected light beam for generating an electrical signal that is substantially linearly proportional to the position on the detector that is struck by said reflected light beam.

10. An optical scanning assembly according to claim 9 wherein the reflective surface on the backside of the mirror element is substantially the same size as the light beam that strikes it, thereby to minimize various reflections from the backside of the mirror element onto the detector.

11. An optical scanning assembly according to claim 9 wherein said means for directing a light beam onto the reflective surface includes an optical element for causing the reflected light beam to be focused into a substantial point on the detector.

12. An optical scanning assembly according to claim 11 wherein the detector includes a photosensitive area that is limited to a substantial line across which said substantial point of light travels in response to rotation of said mirror element about its axis.

13. An optical scanning instrument, comprising:
a point radiation detector which generates a time varying electrical signal that is proportional to the intensity of radiation incident thereon,
a rotating mirror assembly for scanning the horizontal aspects of an object field image across said point detector,
an angularly rotatable mirror positioned to scan the vertical aspects of the object radiation field image across said detector,
a torque motor for angularly rotating said vertical scanning mirror,
an electronic circuit for synthesizing a voltage function that is proportional to the desired motion of the vertical scanning mirror,
a reflective surface on the backside of said scanning mirror,
means for directing a light beam against the reflective surface on the backside of the vertical mirror, thereby to generate a reflected light beam that travels in a path dependent upon the angular position of the vertical scanning mirror,
a photosensitive detector positioned in the path of the reflected light beam to generate an electrical signal that is proportional to the position on the detector at which the reflected light beam strikes,
means for comparing the detector output signal with the synthesized voltage function and for developing an electrical signal proportional to the differences therebetween,
an electronic differentiating circuit receiving the output signal of the detector,
means for adding the differential signal to said difference signal, thereby producing a composite error signal that includes electronic damping, and
means responsive to said error signal for driving said torque motor in a direction to minimize said error signal.

14. An optical scanning assembly according to claim 9 which additionally comprises:
means for generating a reference electric signal proportional to the desired angular rotation of said mirror as a function of time,
means receiving said reference electric signal and said electrical signal from said detecting means for continuously generating an error signal proportional to a difference between said reference and detector signals, and
means receiving said error signal for driving said mirror electric motor in a direction to minimize said error signal.

15. An optical scanning assembly, comprising:
an optical element rotatable about an axis through a defined arc distance for directing an object image onto an image detector and for scanning that image in at least one direction over the image detector,
an electrical motor operably connected to said optical element for angularly rotating said element back and forth throughout its said defined arc distance, means directing a light beam toward said optical element for generating a reflected light beam having a position that is proportional to the angular position of the optical element, and position detecting means in the path of said reflected light beam for generating an electrical signal that is proportional to the position on the position detector struck by said reflected light beam.

16. An optical scanning assembly according to claim 15 which additionaly comprises:

means for generating a reference electric signal proportional to the desired angular rotation of said mirror as a function of time and in synchronism with a video vertical scanning oscillator output, means receiving said reference electric signal and said electrical signal from said detecting means for continuously generating an error signal proportional to a difference between said reference and detector signals, and means receiving said error signal for driving said mirror electric motor in a direction to minimize said error signal.

17. An optical scanning instrument, comprising:

a point radiation detector which generates a time varying electrical signal that is proportional to the intensity of radiation incident thereon, a rotating mirror assembly for scanning the horizontal aspects of an object field image across said point detector, an angularly rotatable mirror positioned to scan the vertical aspects of the object radiation field image across said detector, an electric motor for angularly rotating said vertical scanning mirror, a vertical scanning electronic oscillator generating a generally sawtooth waveform, and means receiving said vertical generally sawtooth waveform for applying it to said electric motor, whereby said angularly rotatable mirror is rocked in synchronism with said vertical scanning electronic oscillator output.

* * * * *